(12) United States Patent
McCune et al.

(10) Patent No.: US 9,976,437 B2
(45) Date of Patent: May 22, 2018

(54) EPICYCLIC GEAR TRAIN

(71) Applicant: UNITED TECHNOLOGIES CORPORATION, Hartford, CT (US)

(72) Inventors: Michael E. McCune, Colchester, CT (US); Lawrence E. Portlock, Bethany, CT (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 467 days.

(21) Appl. No.: 14/824,351

(22) Filed: Aug. 12, 2015

(65) Prior Publication Data

US 2015/0345321 A1    Dec. 3, 2015

Related U.S. Application Data

(63) Continuation-in-part of application No. 13/486,766, filed on Jun. 1, 2012, which is a continuation of
(Continued)

(51) Int. Cl.
*F16H 57/08* (2006.01)
*F01D 15/12* (2006.01)
(Continued)

(52) U.S. Cl.
CPC .............. *F01D 15/12* (2013.01); *F01D 1/02* (2013.01); *F01D 5/02* (2013.01); *F01D 5/027* (2013.01);
(Continued)

(58) Field of Classification Search
CPC ..................................... F02K 3/06; F02C 7/36
See application file for complete search history.

(56) References Cited

U.S. PATENT DOCUMENTS 2,288,792 A   7/1942  Daniels
2,684,591 A   7/1954  Lundquist
(Continued)

FOREIGN PATENT DOCUMENTS

CN   1952435   4/2007
EP   1114949   7/2001
(Continued)

OTHER PUBLICATIONS

Petition for Inter Partes Review of U.S. Pat. No. 8,894,538. *General Electric Company*, Petitioner, v. *United Technologies Corporation*, Patent Owner. Filed Mar. 1, 2017.
(Continued)

*Primary Examiner* — Derek D Knight
(74) *Attorney, Agent, or Firm* — Carlson, Gaskey & Olds, P.C.

(57) ABSTRACT

A turbine engine has a fan shaft. At least one tapered bearing is mounted on the fan shaft. The fan shaft includes at least one passage extending in a direction having at least a radial component, and adjacent the at least one tapered bearing. A fan is mounted for rotation on the tapered bearing. An epicyclic gear train is coupled to drive the fan. The epicyclic gear train includes a carrier supporting intermediate gears that mesh with a sun gear. A ring gear surrounds and meshes with the intermediate gears. Each of the intermediate gears are supported on a respective journal bearing. The epicyclic gear train defines a gear reduction ratio of greater than or equal to about 2.3. A turbine section is coupled to drive the fan through the epicyclic gear train. The turbine section has a fan drive turbine that includes a pressure ratio that is greater than about 5. The fan includes a pressure ratio that is less than about 1.45, and the fan has a bypass ratio of greater than about ten (10).

12 Claims, 3 Drawing Sheets

Related U.S. Application Data application No. 13/340,735, filed on Dec. 30, 2011, now Pat. No. 8,708,863, which is a continuation-in-part of application No. 11/504,220, filed on Aug. 15, 2006, now Pat. No. 8,753,243.

(51) Int. Cl.

| F01D 25/18 | (2006.01) |
|---|---|
| F01D 25/16 | (2006.01) |
| F01D 1/02 | (2006.01) |
| F01D 5/02 | (2006.01) |
| F02C 7/32 | (2006.01) |
| F16H 57/04 | (2010.01) |

(52) U.S. Cl.
CPC ............ *F01D 25/16* (2013.01); *F01D 25/18* (2013.01); *F02C 7/32* (2013.01); *F05D 2220/32* (2013.01); *F05D 2220/36* (2013.01); *F05D 2240/70* (2013.01); *F05D 2260/34* (2013.01); *F05D 2260/40311* (2013.01); *F16H 57/0423* (2013.01); *F16H 57/0479* (2013.01); *F16H 57/0486* (2013.01); *F16H 2057/085* (2013.01)

(56) References Cited

U.S. PATENT DOCUMENTS

| 3,160,026 | A | 12/1964 | Rosen |
|---|---|---|---|
| 3,287,906 | A | 11/1966 | McCormick |
| 3,352,178 | A | 11/1967 | Lindgren et al. |
| 3,722,323 | A | 3/1973 | Welch |
| 3,747,343 | A | 7/1973 | Rosen |
| 3,754,484 | A | 8/1973 | Roberts |
| 3,892,358 | A | 7/1975 | Gisslen |
| 4,130,872 | A | 12/1978 | Harloff |
| 4,583,413 | A | 4/1986 | Lack |
| 5,211,541 | A | 5/1993 | Fledderjohn et al. |
| 5,302,031 | A | 4/1994 | Yuasa |
| 5,391,125 | A | 2/1995 | Turra et al. |
| 5,433,674 | A | 7/1995 | Sheridan et al. |
| 5,447,411 | A | 9/1995 | Curley et al. |
| 5,466,198 | A | 11/1995 | McKibbin et al. |
| 5,472,383 | A | 12/1995 | McKibbin |
| 5,524,847 | A | 6/1996 | Brodell et al. |
| 5,778,659 | A | 7/1998 | Duesler et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 6,158,210 | A | 12/2000 | Orlando |
| 6,223,616 | B1 | 5/2001 | Sheridan |
| 6,318,070 | B1 | 11/2001 | Rey et al. |
| 6,402,654 | B1 | 6/2002 | Lanzon et al. |
| 6,530,858 | B1 | 3/2003 | Uroso et al. |
| 6,669,597 | B1 | 12/2003 | Uroso et al. |
| 6,732,502 | B2 | 5/2004 | Seda et al. |
| 6,814,541 | B2 | 11/2004 | Evans et al. |
| 7,021,042 | B2 | 4/2006 | Law |
| 7,591,754 | B2 | 9/2009 | Duong et al. |
| 7,662,059 | B2 | 2/2010 | McCune |
| 7,704,178 | B2 | 4/2010 | Sheridan et al. |
| 7,824,305 | B2 | 11/2010 | Duong et al. |
| 7,926,260 | B2 | 4/2011 | Sheridan et al. |
| 8,074,440 | B2 | 12/2011 | Kohlenberg |
| 8,205,432 | B2 | 6/2012 | Sheridan |
| 8,939,864 | B2 * | 1/2015 | McCune ............... F01D 5/027 475/331 |
| 2002/0064327 | A1 | 5/2002 | Toda et al. |
| 2004/0112041 | A1 | 6/2004 | Law |
| 2005/0026745 | A1 | 2/2005 | Mitrovic |
| 2008/0006018 | A1 | 1/2008 | Sheridan et al. |
| 2008/0044276 | A1 | 2/2008 | McCune et al. |
| 2008/0096714 | A1 | 4/2008 | McCune |
| 2008/0116009 | A1 | 5/2008 | Sheridan et al. |
| 2009/0053058 | A1 | 2/2009 | Kohlenberg et al. |
| 2009/0056306 | A1 | 3/2009 | Suciu et al. |
| 2009/0081039 | A1 | 3/2009 | McCune et al. |
| 2009/0090096 | A1 | 4/2009 | Sheridan |
| 2009/0111639 | A1 | 4/2009 | Klingels |
| 2009/0293278 | A1 | 12/2009 | Duong et al. |
| 2009/0298640 | A1 | 12/2009 | Duong et al. |
| 2009/0314881 | A1 | 12/2009 | Suciu et al. |
| 2010/0148396 | A1 | 6/2010 | Xie et al. |
| 2010/0331139 | A1 | 12/2010 | McCune |
| 2011/0130246 | A1 | 6/2011 | McCune |
| 2012/0124964 | A1 | 5/2012 | Hasel et al. |
| 2012/0275904 | A1 | 11/2012 | McCune et al. |
| 2013/0023378 | A1 | 1/2013 | McCune et al. |
| 2014/0154054 | A1 | 6/2014 | Sheridan et al. |
| 2014/0230403 | A1 | 8/2014 | Merry et al. |
| 2015/0065285 | A1 | 3/2015 | McCune et al. |

FOREIGN PATENT DOCUMENTS

| EP | 1876338 | 1/2008 |
|---|---|---|
| EP | 1890054 | 2/2008 |
| EP | 1925855 | 5/2008 |
| EP | 2224100 | 9/2010 |
| EP | 2559913 | 2/2013 |
| EP | 2610463 | 7/2013 |
| FR | 1357038 | 4/1964 |
| GB | 1516041 | 6/1978 |
| GB | 2041090 | 9/1980 |
| JP | 5248267 | 9/1993 |
| JP | 9317833 | 12/1997 |
| JP | 2001208146 | 8/2001 |
| JP | 3920031 | 5/2007 |
| JP | 2015137649 A | 7/2015 |
| WO | 2007038674 | 4/2007 |
| WO | 20130147951 | 10/2013 |
| WO | 2015017041 A1 | 2/2015 |

OTHER PUBLICATIONS

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Wilfert, G. (2008). Geared fan. Aero-Engine Design: From State of the Art Turbofans Towards Innovative Architectures, von Korman Institute for Fluid Dynamics, Belgium, Mar. 3-7, 2008. pp. 1-26.

Decision Institution of Inter Partes Review. *General Electric Company*, Petitioner, v. *United Technologies Corp.*, Patent Owner. IPR2017-01001. U.S. Pat. No. 8,894,538. Entered Jul. 10, 2017. pp. 1-4.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

(56) References Cited

OTHER PUBLICATIONS

Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau K. Gu, C. and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Pyrograf-III Carbon Nanofiber. Product guide. Retrieved from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc.
Ratna, D. (2009). Handbook of thermoset resins. Shawbury, UK: iSmithers.
Wendus, B.E., Stark, D.F., Holler, R.P., and Funkhouser, M.E. (2003). Follow-on technology requirement study for advanced subsonic transport. NASA/CR-2003-212467.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.
File History for U.S. Appl. No. 12/131,876.
Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.
Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines-Turbofan. Feb. 8, 2012.
Ivchenko-Progress AI-727M. Jane's Aero-engines, Aero-engines-Turbofan. Nov. 27, 2011.
Ivchenko-Progress D-727. Jane's Aero-engines, Aero-engines-Turbofan. Feb. 7, 2007.
Turbomeca Aubisque. Jane's Aero-engines, Aero-engines-Turbofan. Nov. 2, 2009.
Aviadvigatel D-110. Jane's Aero-engines, Aero-engines-Turbofan. Jun. 1, 2010.
Rolls-Royce M45H. Jane's Aero-engines, Aero-engines-Turbofan. Feb. 24, 2010.
Honeywell LF502. Jane's Aero-engines, Aero-engines-Turbofan. Feb. 9, 2012.
Honeywell LF507. Jane's Aero-engines, Aero-engines-Turbofan. Feb. 9, 2012.
Honeywell TFE731. Jane's Aero-engines, Aero-engines-Turbofan. Jul. 18, 2012.
European Search Report for European Application No. 16183877.6 dated Jan. 5, 2017.
Notice of Opposition to U.S. Pat. No. 2,610,463. United Technologies Corporation opposed by Safran Aircraft Engines. dated Aug. 3, 2016.
European Search Report for European Application No. 161740683 dated Nov. 22, 2016.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
European Search Report for European Patent Application No. 12198045.2 dated Sep. 7, 2015.
The International Preliminary Report on Patentability for PCT Application No. PCT/US2012/071906, dated Jul. 24, 2014.
Meier, N (2005). Civil Turbojet/Turbofan Specifications. Retrieved from http://www.jet-engine.net/civtfspec.html.
Zalud, "Gears Put a New Spin on Turbofan Performance" Machine Design, Nov. 5, 1998, 2010Penton Media, Inc., 5 pp.
The European Search Report and Written Opinion for European Application No. EP 12198136, dated Aug. 21, 2013.
The International Search Report and Written Opinion for International Application No. PCT/US2012/071906, dated Aug. 22, 2013.
Kandebo; Geared-Turbofan Engine Design Targets Cost, Complexity, Aviation Week & Space Technology; New York; Feb. 23, 1998, 4 pp.

(56) References Cited

OTHER PUBLICATIONS

Hendricks et al, "Performance and Weight Estimates for an Advanced Open Rotor Engine" NASA/TM-2012-217710, Sep. 2012, 20 pp.
Gunston, "Jane's Aero-Engines" Pratt & Whitney/USA, Mar. 2000, JAEng-Issue 7, 5 pp.
Japanese Office Action for Japanese Application No. 2007-202444, dated Aug. 3, 2010.
European Search Report for EP Application No. 07253078.5, dated Dec. 5, 2007.
Extended European Search Report for European Application No. 16171476.1 dated Oct. 6, 2016.

\* cited by examiner

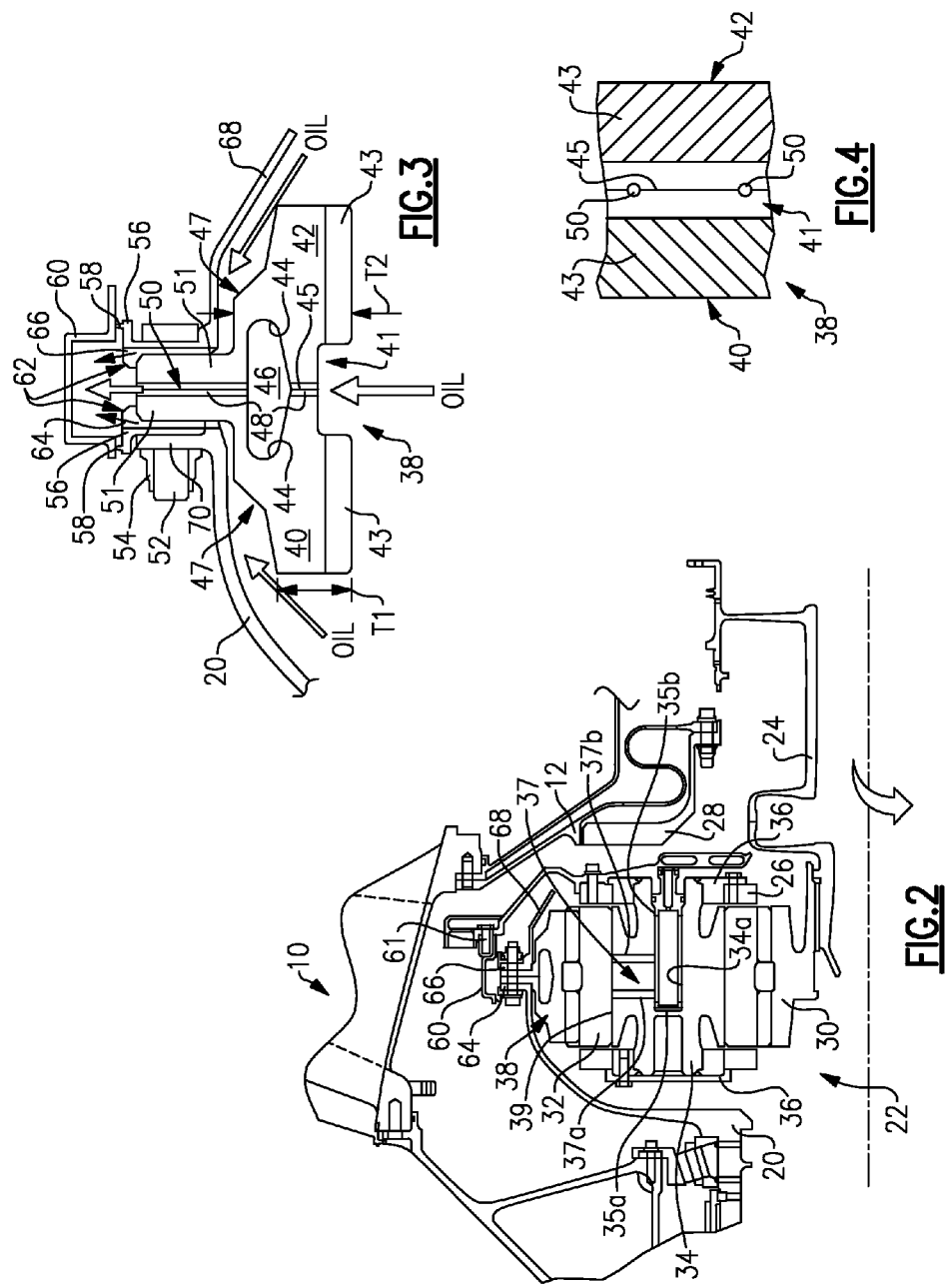

EPICYCLIC GEAR TRAIN

CROSS REFERENCE TO RELATED APPLICATIONS

The present disclosure is a continuation-in-part of U.S. patent application Ser. No. 13/486,766, filed Jun. 1, 2012, which is a continuation of U.S. patent application Ser. No. 13/340,735, filed Dec. 30, 2011, now U.S. Pat. No. 8,708,863, granted Apr. 29, 2014, which is a continuation-in-part of U.S. patent application Ser. No. 11/504,220, filed Aug. 15, 2006, now U.S. Pat. No. 8,753,243, granted Jun. 17, 2014.

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY OF THE INVENTION

In a featured embodiment, a turbine engine has a fan shaft. At least one tapered bearing is mounted on the fan shaft. The fan shaft includes at least one passage extending in a direction having at least a radial component, and adjacent the at least one tapered bearing. A fan is mounted for rotation on the tapered bearing. An epicyclic gear train is coupled to drive the fan. The epicyclic gear train includes a carrier supporting intermediate gears that mesh with a sun gear. A ring gear surrounds and meshes with the intermediate gears. Each of the intermediate gears are supported on a respective journal bearing. The epicyclic gear train defines a gear reduction ratio of greater than or equal to about 2.3. A turbine section is coupled to drive the fan through the epicyclic gear train. The turbine section has a fan drive turbine that includes a pressure ratio that is greater than about 5. The fan includes a pressure ratio that is less than about 1.45, and the fan has a bypass ratio of greater than about ten (10).

In another embodiment according to the previous embodiment, the fan shaft is coupled to the ring gear.

In another embodiment according to any of the previous embodiments, the at least one tapered bearing includes a first tapered bearing and the at least one passage includes a first passage and a second passage. The first passage is located at an axially forward side of the first tapered bearing and the second passage is located at an axially aft side of the first tapered bearing.

In another embodiment according to any of the previous embodiments, the fan shaft includes, on a radially inner surface, at least one well extending between axial sides and a radial side, and the at least one passage opens at the radial side.

In another embodiment according to any of the previous embodiments, the fan shaft includes, on a radially inner surface, a plurality of wells each extending between axial side walls and a radial side wall, and the at least one passage includes a plurality of passages that open at respective ones of the radial side walls of the plurality of wells.

In another embodiment according to any of the previous embodiments, two wells of the plurality of wells are axially adjacent such that the two wells share a common axial side wall.

In another embodiment according to any of the previous embodiments, the axial side walls are gradually sloped.

In another embodiment according to any of the previous embodiments, the epicyclic gear train has a gear reduction ratio of greater than or equal to 2.3.

In another embodiment according to any of the previous embodiments, the epicyclic gear train has a gear reduction ratio of greater than or equal to about 2.5.

In another embodiment according to any of the previous embodiments, the epicyclic gear train has a gear reduction ratio of greater than or equal to 2.5.

In another embodiment according to any of the previous embodiments, the fan defines a bypass ratio of greater than about 10.5:1 with regard to a bypass airflow and a core airflow.

In another embodiment according to any of the previous embodiments, there are three turbines, with the fan drive turbine being a lowest pressure turbine, and there being a high pressure turbine and an intermediate pressure turbine, with the high pressure turbine and the intermediate pressure turbine each driving a compressor rotor.

Although different examples have the specific components shown in the illustrations, embodiments of this invention are not limited to those particular combinations. It is possible to use some of the components or features from one of the examples in combination with features or components of another of the examples.

These and other features disclosed herein can be best understood from the following specification and drawings, the following of which is a brief description.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION

Figure 1:
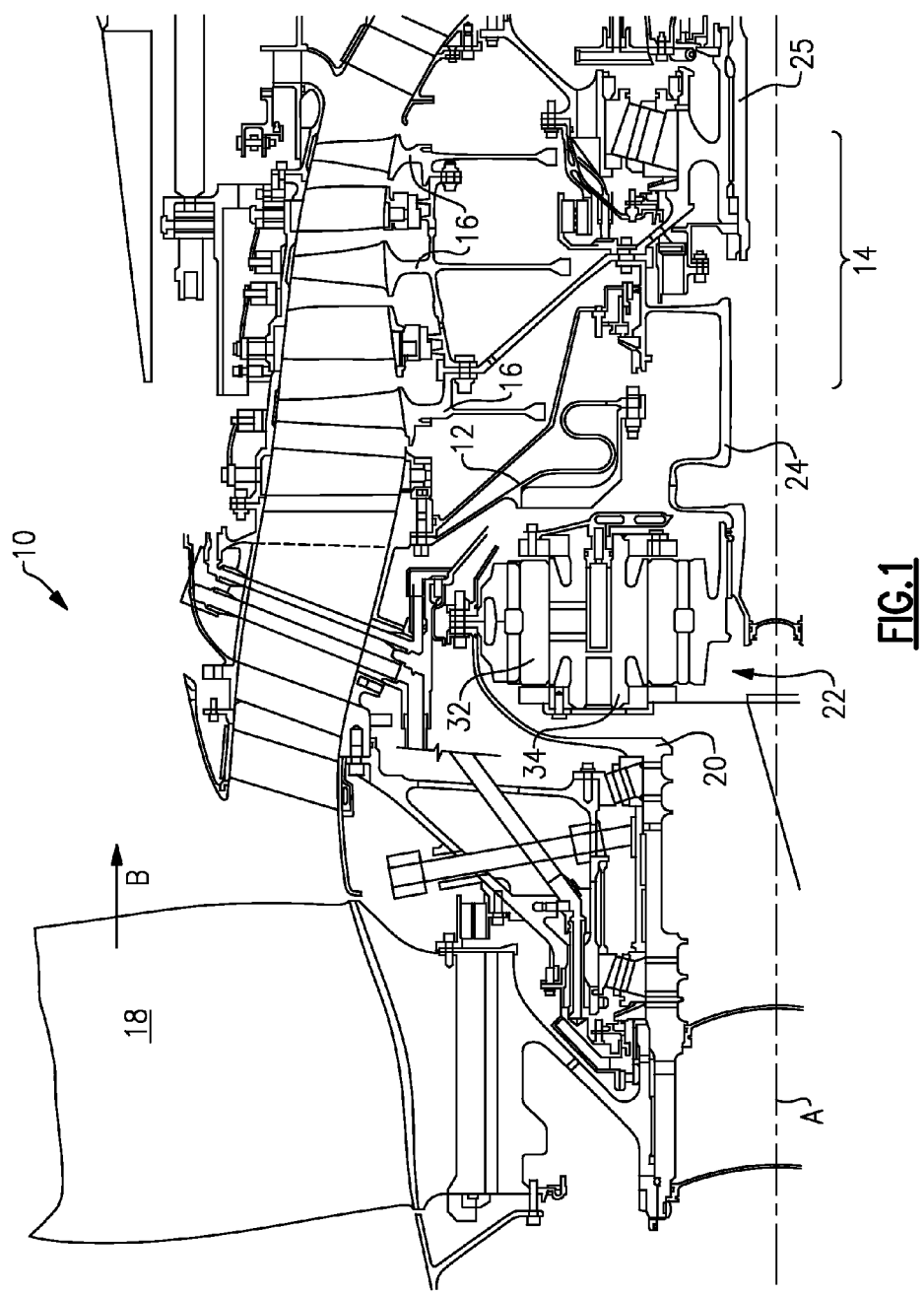
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

As shown, each of the star gears 32 is supported on one of the journal bearings 34. Each journal bearing 34 has an internal central cavity 34a that extends between axial ends 35a and 35b. In this example, as shown, the internal central cavity 34a is axially blind in that the axial end 35a is closed. At least one passage 37 extends from the internal central cavity 34a to a peripheral journal surface 39. In the example, the at least one passage 37 includes a first passage 37a and a second passage 37b that is axially spaced form the first passage 37a. As shown, the first and second passages 37a and 37a are non-uniformly spaced with regard to the axial ends 35a and 35b of the internal central cavity 34a.

In operation, lubricant is provided to the internal central cavity 34a. The lubricant flows through the internal central cavity 34a and then outwardly through the at least one passage 37 to the peripheral journal surface 39. The arrangement of the internal central cavity 34a and at least one passage 37 thereby serves to cool and lubricate the journal bearing 32.

The gas turbine engine 10 is a high-bypass geared architecture aircraft engine. In one disclosed, non-limiting embodiment, the engine 10 has a bypass ratio that is greater than about six (6) to ten (10), the epicyclic gear train 22 is a planetary gear system or other gear system with a gear reduction ratio of greater than about 2.3 or greater than about 2.5, and a low pressure turbine of the engine 10 has a pressure ratio that is greater than about 5. In one disclosed embodiment, the engine 10 bypass ratio is greater than about ten (10:1) or greater than about 10.5:1, the turbofan 18 diameter is significantly larger than that of the low pressure compressor of the compressor section 14, and the low pressure turbine has a pressure ratio that is greater than about 5:1. In one example, the epicyclic gear train 22 has a gear reduction ratio of greater than about 2.3:1 or greater than about 2.5:1. It should be understood, however, that the above parameters are only exemplary of one embodiment of a geared architecture engine and that the present invention is applicable to other gas turbine engines including direct drive turbofans.

A significant amount of thrust is provided by a bypass flow B due to the high bypass ratio. The fan 18 of the engine 10 is designed for a particular flight condition—typically cruise at about 0.8M and about 35,000 feet. The flight condition of 0.8 M and 35,000 ft, with the engine at its best fuel consumption—also known as "bucket cruise TSFC"—is the industry standard parameter of lbm of fuel being burned divided by lbf of thrust the engine produces at that minimum point. "Low fan pressure ratio" is the pressure ratio across the fan blade alone. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Figure 5:
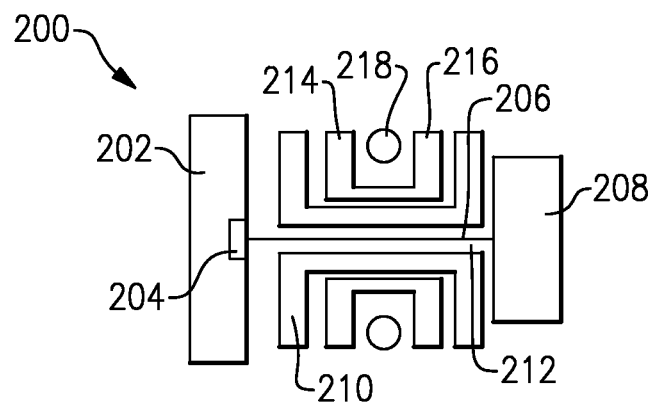
FIG. 5 shows another embodiment.

FIG. 5 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 6:
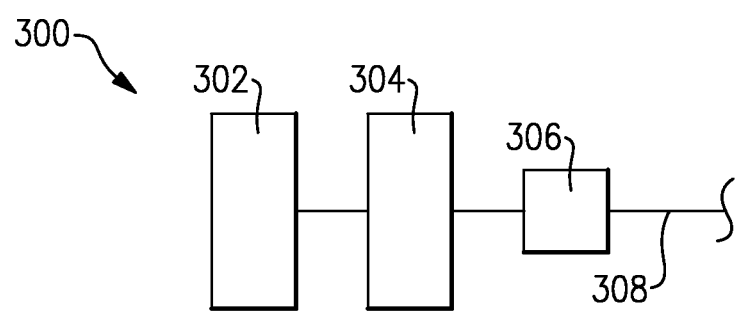
FIG. 6 shows yet another embodiment.

FIG. 6 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A turbine engine comprising:
   a fan shaft;
   at least one tapered bearing mounted on the fan shaft, the fan shaft including at least one passage extending in a direction having at least a radial component, and adjacent the at least one tapered bearing;
   a fan mounted for rotation on the tapered bearing;
   an epicyclic gear train coupled to drive the fan, the epicyclic gear train including a carrier supporting intermediate gears that mesh with a sun gear, and a ring gear surrounding and meshing with the intermediate gears, each of the intermediate gears being supported on a respective journal bearing, wherein the epicyclic gear train defines a gear reduction ratio of greater than or equal to about 2.3; and
   a turbine section coupled to drive the fan through the epicyclic gear train, the turbine section having a fan drive turbine that includes a pressure ratio that is greater than about 5, the fan includes a pressure ratio that is less than about 1.45, and the fan has a bypass ratio of greater than about ten (10).

2. The turbine engine as recited in claim 1, wherein the fan shaft is coupled to the ring gear.

3. The turbine engine as recited in claim 1, wherein the at least one tapered bearing includes a first tapered bearing and the at least one passage includes a first passage and a second passage, the first passage being located at an axially forward side of the first tapered bearing and the second passage being located at an axially aft side of the first tapered bearing.

4. The turbine engine as recited in claim 1, wherein the fan shaft includes, on a radially inner surface, at least one well extending between axial sides and a radial side, and the at least one passage opens at the radial side.

5. The turbine engine as recited in claim 1, wherein the fan shaft includes, on a radially inner surface, a plurality of wells each extending between axial side walls and a radial side wall, and the at least one passage includes a plurality of passages that open at respective ones of the radial side walls of the plurality of wells.

6. The turbine engine as recited in claim 5, wherein two wells of the plurality of wells are axially adjacent such that the two wells share a common axial side wall.

7. The turbine engine as recited in claim 5, wherein the axial side walls are gradually sloped.

8. The turbine engine as recited in claim 1, wherein the epicyclic gear train has a gear reduction ratio of greater than or equal to 2.3.

9. The turbine engine as recited in claim 1, wherein the epicyclic gear train has a gear reduction ratio of greater than or equal to about 2.5.

10. The turbine engine as recited in claim 1, wherein the epicyclic gear train has a gear reduction ratio of greater than or equal to 2.5.

11. The turbine engine as recited in claim 1, wherein the fan defines a bypass ratio of greater than about 10.5:1 with regard to a bypass airflow and a core airflow.

12. The turbine engine as recited in claim 1, wherein there are three turbines, with said fan drive turbine being a lowest pressure turbine, and there being a high pressure turbine and an intermediate pressure turbine, with said high pressure turbine and said intermediate pressure turbine each driving a compressor rotor.

* * * * *